United States Patent [19]

Ravipati et al.

[11] Patent Number: 5,163,976

[45] Date of Patent: Nov. 17, 1992

[54] HOT MELT PRESSURE SENSITIVE ADHESIVES

[75] Inventors: Sitaramaiah Ravipati, Latham; Edward C. LaBelle, Albany, both of N.Y.; Robert J. Haeger, Hales Corners, Wis.

[73] Assignee: Norton Company, Worcester, Mass.

[21] Appl. No.: 699,100

[22] Filed: May 13, 1991

[51] Int. Cl.$^5$ ................................ B24B 1/00
[52] U.S. Cl. ........................... 51/295; 51/298; 428/352; 428/355; 525/205; 525/218
[58] Field of Search ............. 51/295, 298, 307; 428/352, 355; 525/205, 218

[56] References Cited

U.S. PATENT DOCUMENTS

| | | | |
|---|---|---|---|
| 3,850,858 | 11/1974 | Park | 260/27 |
| 4,022,728 | 5/1977 | Trotter et al. | 260/27 |
| 4,072,735 | 2/1978 | Ardemagni | 260/897 |
| 4,169,116 | 9/1979 | Trotter et al. | 525/210 |
| 4,210,570 | 7/1980 | Trotter et al. | 260/33.6 |
| 4,217,428 | 8/1980 | McConnell et al. | 525/191 |
| 4,255,164 | 3/1981 | Butzke et al. | 51/295 |
| 4,288,358 | 9/1981 | Trotter et al. | 260/31.8 M |
| 4,543,106 | 9/1985 | Parekh | 51/295 |
| 4,576,612 | 3/1986 | Shulka et al. | 51/295 |
| 4,943,461 | 7/1990 | Karim | 428/352 |

FOREIGN PATENT DOCUMENTS 0103407  3/1984  European Pat. Off. .

*Primary Examiner*—William R. Dixon, Jr.
*Assistant Examiner*—Willie J. Thompson
*Attorney, Agent, or Firm*—David Bennett

[57] ABSTRACT

A coated abrasive disc is described in which the non-abrasive bearing surface of the disc is provided with a pressure sensitive adhesive which comprises an aliphatic polymer, such as a propylene/1-butene/ethylene terpolymer; an aliphatic oil, such as a low molecular weight polybutene; and a tackifying aliphatic resin.

11 Claims, No Drawings

HOT MELT PRESSURE SENSITIVE ADHESIVES

BACKGROUND OF THE INVENTION

This invention relates to a pressure sensitive adhesive, (commonly, and hereafter, called a "PSA") and particularly to hot melt PSAs useful in coated abrasives.

Coated abrasives sold in the form of abrasive discs are frequently designed to be attached to a back-up pad comprising a base support material, which is conventionally made of a rubber, with a vinyl polymer sheet attached to the support and providing the attachment surface.

Such coated abrasive discs comprise an abrasive material adhered to a backing material with the non-abrasive-bearing surface of the backing material being provided with a "tacky" PSA layer. "Tackiness" is defined as the quality possessed by an adhesive when it feels sticky or highly adhesive. It is often used to convey the idea of pressure sensitivity. A PSA having the right level of tackiness will adhere well to a surface pressed against it but will not stick tightly to any surface with which it comes in contact. Thus the PSA layer is tacky enough to provide firm adhesion to a substrate against which it is firmly pressed but not so tacky that it cannot readily be removed. This provides a secure attachment for the abrasive disc while still permitting it to be peeled off when the time comes to replace it and to be easily handled between uses without the need for release films. Tackiness is conveniently measured by the 180° Peel Adhesion test and/or the Loop Adhesion test which are described below.

Because of the ease of use and suitability for a wide range of grinding environments, this design has become very popular. It has not been without its problems however. These stem from the migration of plasticizer present in the vinyl polymer (typically PVC) sheet on the back-up pad to the surface in contact with the PSA layer. A conventional polar PSA readily interacts with the plasticizer and becomes stringy.

"Stringiness" is the tendency of the adhesive to adhere so tightly to the substrate that, when the PSA bearing surface is separated from the substrate, the PSA adheres to both surfaces and forms strings of adhesive between the separating surfaces. These strings eventually break leaving some of the PSA on the substrate which, over a period of time, results in the deposition of a substantial layer of PSA on the substrate. Thus when a PSA-bearing sheet is placed in contact with a PSA-contaminated substrate, the adhesion will be between PSA and PSA rather than with the substrate itself. Naturally this bond tends to be tighter than the bond between the substrate and the PSA, and removal of the PSA-bearing sheet often results in tearing of the sheet rather than clean removal from the substrate. Stringiness generally increases with at high temperature and humidity.

Plasticizers are used in polyvinyl chloride sheet to render the normally very stiff polymer, flexible. Large quantities are used, such as from 25 to 75 parts from 100 parts by wt of the resin. The plasticizer is often an organic ester formed from a long chain ($C_4$–$C_{12}$) alcohol and an organic acid such as phthalic acid, adipic acid, hexanoic acid and the like. The most widely used PVC plasticizers are polar ester plasticizers such as dioctyl phthalate and these display a particularly strong tendency to migrate and cause the problems discussed above.

In seeking to counter this problem, it has been proposed to employ high (typically about $10^6$) molecular weight PSAs which are more resistant to the polar plasticizers. While such products are better than lower molecular weight hot melt PSAs in terms of their resistance to plasticizers, they have other disadvantages that make them an imperfect solution to the problem.

An alternative approach has been to use non polar PSA materials which do not readily interact with polar plasticizers. These products too have had problems that arise as a result of the way in which these products are conventionally sold. A PSA-backed abrasive sheet is usually rolled in one location and then shipped to another location at which strings of linked abrasive discs are punched from the roll. These strings of discs are then rolled up and packaged for sale. Thus the PSA layer may spend a long time in contact with the abrasive layer while rolled up. Many PSA formulations comprise relatively low molecular weight olefin polymer components that can migrate out of the PSA layer and into the abrasive layer. This leads to unsightly blotchiness on the abrading surface, particularly when this surface has a zinc stearate supersize layer. In addition, it is often difficult to secure the requisite level of internal strength using low molecular weight components.

There is, therefore, a great need for a PSA that can be used to attach abrasive discs to a plasticized PVC layer that will remain effective and will have acceptable release properties and cause no stringiness or blotchiness on either side of the abrasive disc even when exposed to a variety of climatic conditions.

GENERAL DESCRIPTION OF THE INVENTION

In its broadest embodiment the present invention provides an abrasive bearing sheet material with the non-abrasive bearing surface coated with a pressure sensitive adhesive comprising:
  a. from about 10 to about 50 parts by weight of an aliphatic polymer;
  b. from about 10 to about 50 parts by weight of an aliphatic oil; and
  c. and from about 10 to about 70 parts by weight of an aliphatic resin.

In a particularly preferred embodiment the invention provides an abrasive disc having the non-abrasive bearing surface coated with a novel pressure sensitive adhesive composition comprising:
  1. from about 15 to about 30% by weight of a propylene/1-butene/ethylene terpolymer;
  2. from about 10 to about 20% by weight of a low molecular weight polybutene;
  3. from about 10 to about 20% by weight of a polyisobutylene; and
  4. a tackifying, low molecular weight aliphatic hydrocarbon in an amount to give the desired level of pressure sensitivity and tackiness.

The above preferred formulation can be further improved against the migration of its lower molecular weight components by incorporation of from about 5 to 10% by weight of a low molecular weight polyethylene and/or from about 5 to about 10% by weight of a thermoplastic rubber comprising an ethylene/butylene copolymer with polystyrene end caps.

It is also advantageous to incorporate an effective amount of an antioxidant to protect against degradation of the polymeric components during prolonged storage or use.

DETAILED DESCRIPTION OF THE INVENTION

In its broadest embodiment the invention comprises an abrasive sheet with a PSA bearing surface having an essentially non-polar character as described above. Where the problems encountered are limited to those related to adhesion, release properties and stringiness, (as a result of plasticizer migration as described above), it is possible to employ a formulation which comprises from about 10 to about 70 wt % of an aliphatic resin; from about 10 to 50 wt % of an aliphatic polymer; and from about 10 to about 50 wt % of an aliphatic oil.

The aliphatic resin employed may comprise any of the tackifying, low molecular weight hydrocarbons discussed below or alternatively may be selected from the broader group which also includes dicyclopentadiene resins such as those marketed by Exxon chemical Co. under the tradename "Vistalon 404"; hydrogenated $C_9$ resins such as those marketed by Arakawa Corp. under the tradename "Arkon P-100"; hydrogenated aromatic resins such as those marketed by Hercules Co. under the tradename "Regelrez 1095"; terpene resins such those marketed by Arizona Chemical Co. under the tradename "Zonarez 7100"; debutanized aromatic concentrates-B which are available from Eastman Chemical Co under the tradename "Eastotac H-100" and the aliphatic resins available from East Coast Chemical Co under the tradename "Escorez-1580".

The aliphatic polymers that may be used in the formulations of the invention include, in addition to those low molecular weight polybutenes discussed below, naphthenic-paraffinic oils such as those available from Witco under the tradename "Kaydol", and from Shell Chemical Co. under the tradename "Shellflex-371", (Shellflex has a slight but, for the purposes of this invention, insignificant aromatic content).

The aliphatic polymers useful in the formulations of the present invention include those ethylene/1-butene/-propylene polymers discussed below in the context of the preferred formulations but more broadly also includes ethylene/propylene rubbers such as those sold by Exxon Chemical Co. under the tradename "Vistalon"; EPDM, (ethylene/propylene/diene) rubbers such as those sold by Chemische Werke Huels Ag under the tradename "Vestoplast", and by Uniroyal Chemical Co. under the tradename "Royalene"; butyl rubbers such as those sold by Exxon Chemical Co. under the tradename "Butyl 065"; and ethylene/butylene copolymers such as those sold by Shell Chemical Co. under the tradename "Shellflex 371".

The proportions of the components described above can be varied within the ranges specified to achieve different combinations of properties. Within these parameters, the aliphatic polymer may provide from about 10 to about 50, and preferably from about 15 to about 30 wt. % of the formulation; the aliphatic oil may provide from about 10 to about 50, and preferably from 10 to about 20 wt % of the formulation and the aliphatic resin provides from about 10 to about 70 wt % and preferably enough to secure a Loop Tack value of from about 0.5 to 4.5 lbs/inch.

While the desired overall properties are achieved by balancing all those of the individual components, it is possible to identify functions that are predominantly performed by one or more of the individual components. Thus the aliphatic polymer contributes to the internal strength of the formulation; the aliphatic oil contributes to the non-polar nature of the formulation; and the aliphatic resin supplies the necessary tackifying properties of the formulation.

With preferred abrasive bearing sheets of the invention there is the additional problem of blotchiness a described above, and for such applications the preferred formulations set forth above are found to be particularly effective.

In the specifically preferred formulations, the propylene/1-butene/ethylene terpolymer contributes significant internal strength to the overall composition and thus the polymer used should be capable of performing this function. Such polymers typically have a melt viscosity of about 100,000 in Pa.sec. (at 190° C.) and a (ring and ball) softening point of at least about 120° C. Such terpolymers are known as components of PSAs and are typified by certain of the "Vestoplast" polymers available under that trade name from Chemische Werke Huels AG.

These terpolymers can be present in a total amount of from about 15 to about 30% of the total formulation weight but the preferred amount is from about 15 to about 20% by weight.

The non-polar character of the formulation, and the elasticity, is largely supplied by the $C_4$ polymer components. These comprise a low molecular weight polybutene and a higher molecular weight rubbery polyisobutylene.

The low molecular weight polybutenes are polymers composed predominantly of mono-olefins having four carbon atoms (85 percent to 98 percent by weight), the balance being isoparaffins. The molecular weight of the polybutene should be in the range of about 300–3000 (as determined by Microlab Osmometer). Such polymers, which are particularly useful in the invention, and commercially available under the trade name "Indopol" from Amoco Chemicals, are for example, Indopol H-300 polymers. The polybutenes can be used in amounts of about 10 percent to 20 percent by weight of the adhesive composition, preferably about 15 percent to about 20 percent by weight.

The polyisobutylenes particularly useful in the adhesive compositions of this invention are highly paraffinic hydrocarbon polymers composed of long straight-chain molecules having terminal unsaturation only. The preferred isobutylene polymer is a butyl rubber. The term "butyl rubber" as used herein is intended to define rubbery copolymers of isobutylene with a diolefin containing 4 to 14 carbon atoms, usually isoprene, but diolefins such as butadiene, dimethyl butadiene and pentadiene may also be used, said copolymers containing 85 to 99.5 parts by weight of the olefin and 15 to 0.5 parts by weight of the diolefin. Such polymers are exemplified by the commercially available polyisobutylene having the trade name "Vistanex" from Enjay Chemical Company which has a Staudinger molecular weight of 20,000 to 80,000. Vistanex LM-MS and LM-MH which have molecular weights of about 35,000 to about 46,000, respectively, are particularly useful in the adhesive composition of this invention. These polyisobutylenes can be used in amounts of about 10 percent to 20 percent by weight of the adhesive composition, preferably about 10 percent to about 15 percent by weight.

It should be noted that an amount of the polybutene at the upper end of the specified range can lead to significant problems in the novel abrasive discs of this invention. This is because the low molecular weight components tend to migrate to the PSA surface and transfer to contiguous abrasive surfaces, producing unsightly blotchiness on the abrasive surface.

To counteract this, it is desirable to add a component that retards migration of low molecular weight components. The preferred retardants used in the present invention include a low molecular weight polyethylene wax having a Brookfield viscosity (at 140° C.) of less than 200 cps. Typical suitable polyethylene waxes are available from Allied as "A-C" polyethylene waxes, particularly A-C 617. The most preferred formulations comprise from about 5 to about 10% of such a product and preferably from about 6 to about 8% by weight.

An alternative or, more preferably, additional retardant is a thermoplastic rubber comprising a copolymer of ethylene and butylene having polystyrene end caps. Though the end caps have a polar character, the amount present in the total formulation is not such as to increase significantly the ease with which a polar plasticizer can migrate into the PSA. It is, however, desirable that the weight percent of the styrene end caps should be at least about 5% but less than about 20% and preferably less than about 15% of the total weight of the capped copolymer weight. Such rubbery copolymers are known as components of PSA formulations and are typified by Kraton GX1657 thermoplastic rubber available from Shell Chemical Co. Preferred formulations according to the invention comprise about 5 to about 10% and more preferably from about 6 to about 8% by weight of such a thermoplastic rubber component.

The formulations of the invention also comprise an abrasive resin which is preferably a low molecular weight aliphatic hydrocarbon tackifying agent. These materials are well known in the context of PSA formulations and have the function of controlling the level of pressure sensitivity in the overall formulation. The tackifying agent can be a hydrocarbon resin, a synthetic polyterpene or mixed olefin/diolefin polymers. The agent should have an overall non-polar character and preferably a relatively narrow molecular weight distribution. Such products are typified by Hercules' "Piccotac" 95 aliphatic hydrocarbon resins. The amount of this component that may be present can be from about 25 to about 45% by weight but the formulations with the greatest utility as PSA's for use in conjunction with abrasive sheets comprise from about 30 to about 50% and most preferably about 32 to about 38% by weight of the total formulation weight.

The formulations of the invention preferably contain in addition an effective amount of an antioxidant. The available antioxidants are well known in the industry and include, for example: "Ionox" 220 and 330, [tris(di-t-butyl-p-hydroxybenzyl)-trimethylbenzene]; "Dalpac" 4C2, [6-di(t-butyl)-p-cresol]; "Naugawhite", (alkylated bisphenol); "Butyl Zimate", (zinc dibutyl dithiocarbamate); and "Ethyl" 702, [4,4'-methylene bis(2,6-di-tert-butyl-phenol)]. A particularly effective antioxidant is "Irganox" 1010 which is identified as tetrakis[methylene-3-(3',5'-di-t-butyl-4'-hydroxypheny)propionate]methane. Of these, "Irganox" 1010 is the preferred antioxidant. The amount used is generally less than about 1% and preferably less than about 0.5% of the total formulation weight.

The tackiness of the PSA is conveniently measured by its 180° Peel Adhesion which may be measured by the technique dsecribed in Test Method PSTC-1 developed by the Specifications and Technical Committee of the Pressure Sensitive Tape Council. As measured by this test the preferred PSA of the invention has a peel adhesion of from about 30 to about 90, and more preferably about 35 to about 50, oz/inch width.

An alternative or additional test of the "Quick Stick" performance of a PSA is the 90° "Loop Tack" test which is performed on a 5 inch×1 inch strip formed into a loop with the adhesive bearing surface on the outside. A one inch overlap of the loop is placed in the jaws of a standard "Instron" machine and a stainless steel surface is brought into contact with the PSA-bearing surface of the loop for 5 seconds. The jaws are then separated at a 12 inches per minute jaw separation rate. The force registered on the Instron is the Loop Tack value. The test is conducted at a temperature of approximately 22 ($\pm$1.5)° C. and a relative humidity of approximately 40 ($\pm$4)% and is designed to evaluate the tendency of the PSA to stick directly to a surface without external applied pressure. Preferred PSA formulations for use with abrasive sheets of the invention have a Loop Tack adhesion value of from 0.5 to 4.5 and preferably from 1.0 to 2.5 lbs/inch.

The abrasive sheet can be in any suitable form such as a sheet, belt or disc. The most common practice is to provide a large abrasive sheet, apply a PSA to the back (i.e. non abrasive-bearing) surface, roll the sheet, and, at a later stage, punch out abrasive discs with the desired dimensions from the roll.

An abrasive sheet typically comprises a backing material bearing, on one surface a layer of abrasive grits held by maker, size and, often, supersize coats. The backing material can be a woven or non-woven cloth but the applications in which the present invention finds its greatest utility are paper abrasive coated products. The non-abrasive bearing surface may be laminated to a layer containing product information or this information may be printed directly on the surface of the backing before application of the PSA.

The abrasive surface is often treated with a supersize layer containing a grinding aid and/or an anti blocking additive. These layers are applied in a polymeric carrier which is typically an acrylic polymer. As indicated above, low molecular weight components of a conventional PSA can interact with this layer to produce unsightly blotchiness on the abrasive surface and, in extreme cases, contamination of the abraded surface.

The amount of the PSA that is used will depend to a large extent on the nature of the backing substrate to which it is applied and to the abrasive layer itself. Generally however applications using paper with a weight of 50 lbs/3000 square feet and an 80 grit abrasive require an application level of from about 1.5 to about 2.5 lbs/330 square feet of the substrate. Heavier duty paper or cloth backings usually require applications at the higher end of this range whereas lighter paper stock usually needs less. Larger grit sizes tend to require heavier substrates and application levels that are higher than are needed for finer grits, perhaps as high as 15 lbs/330 square feet.

The use of the novel PSA described above is found to have little or no blotchiness problems while still providing an effective, readily releasable bond between the abrasive sheet and a substrate.

DESCRIPTION OF PREFERRED EMBODIMENT

The invention is now further described with reference to specific embodiments that are illustrative of the invention, but which should not be taken as implying any necessary limitation on the essential scope of the invention.

EXAMPLE 1

In each of the specific embodiments described below, one surface of a roll of paper, (with a weight of 50 lbs per 3000 square feet), was given an abrasive layer adhered by maker and size coats and, in two embodiments, a supersize layer of zinc stearate in an acrylic polymer carrier. This coated abrasive roll was printed with identifying data on the back side which was then given a coating of a PSA having the formulation:

18.58% of a propylene/butene/ethylene terpolymer (Vestoplast V-4923)
16.36% of a low molecular weight (Indepol H-300) polybutene
14.88% of a (Vistanex LM-MS) butyl rubber
35.68% of a tackifying agent (Piccotac-95)
6.70% of a polyethylene wax (A-C 617)
7.44% of a polystyrene capped ethylene/butylene copolymer (Kraton GX-1657)
0.38% of an antioxidant (Irganox 1010)

The PSA layer had a softening point (ASTM ring and ball procedure) of 99° C. and a 180° peel adhesion of about 5.0 lb/linear inch.

Linked abrasive discs were cut from the roll and the linked discs were rolled and stored at 130° F. for 7 days. After this time the rolls were examined and found free from blotchiness. To test the stringiness of the PSA the discs were placed in contact with a dioctyl phthalate plasticized vinyl sheet for 48 hours at a temperature of 100° F. and in an atmosphere with 20% relative humidity. Upon separation of the disc from the vinyl sheet, no stringiness was observed. Individual discs were then placed in contact with a dioctyl phthalate-plasticized polyvinyl chloride film carried on a rubber pad of a rotary grinding machine and the disc was then used in a grinding operation for about 5 minutes on different surfaces at which time the disc was dulled.

The details of the manufacture of the discs are set forth in the following table:

TABLE

| Disc No. | Abrasive Used | Supersize | PSA Coat (#/330 ft$^2$) |
|---|---|---|---|
| 1 | 80 grit Alumina | Yes | 2.0 |
| 2 | 400 grit Alumina | Yes | 1.0 |
| 3 | 180 grit Norzon* | No | 1.6 |

*Norzon is a fused alumina/zirconia abrasive available from Norton Co.

At no time did the adhesion between the disc and the machine fail and the abrading suface remained unstained by any PSA component. In addition, the identifying text on the back of the disc remained clear and legible.

EXAMPLE 2

The abrasive containing sheet used in Example 1 was coated with a PSA having the formulation:
a. 3 parts by weight of a "Vestoplast 4923" aliphatic polymer;
b. 1.5 parts by weight of an "Indepol H-300" aliphatic oil; and
c. 5.5 parts by weight of an "Escorez 1580" aliphatic resin.

Following a test procedure similar to that described in Example 1, it was found that there was no stringiness following separation from the underlying substrate. Furthermore, the formulation appeared to provide an adequate adhesive bond during testing under operational conditions.

What is claimed is:

1. An abrasive sheet material comprising a backing material having an abrasive layer secured to one face and a pressure sensitive adhesive layer on the opposed face wherein the pressure sensitive layer comprises:
   a) from about 10 to about 50% by weight of an aliphatic power selected from the group consisting essentially of ethylene/propylene rubbers, ethylene/butylene rubbers, ethylene/propylene/diene rubbers, ethylene/1-butene/propylene polymers and butyl rubbers;
   b) from about 10 to about 50% by weight of an aliphatic oil selected from the group consisting essentially of low molecular weight polybutenes, naphthenic-paraffinic oils and naphthenic-paraffinic oils with a slight aromatic content; and
   c) from about 10 to about 70% by weight of an aliphatic resin selected from the group consisting essentially of polyterpenes, mixed olefin/diolefin polymers and olefin hydrocarbon polymers, dicyclopentadiene, hydrogenated C$_9$ resins, hydrogenated aromatic resins and debutanized aromatic concentrates-B.

2. An abrasive sheet according to claim 1 in which the formulation also comprises an antioxidant.

3. An abrasive sheet according to claim 1 which additionally comprises an additive that retards the migration of low molecular weight components within the formulation selected from polyethylene waxes, ethylene/butylene polymers with polystyrene end caps, and mixtures of such additives.

4. An abrasive sheet material comprising a backing material having an abrasive layer secured to one face and a pressure sensitive adhesive layer on the opposed face wherein the pressure sensitive layer comprises:
   a. from about 15 to about 30% by weight of a propylene/1-butene/ethylene terpolymer;
   b. from about 10 to about 20% by weight of a low molecular weight polybutene;
   c. from about 10 to about 20% by weight of polyisobutylene rubber; and
   d. a low molecular weight aliphatic hydrocarbon tackifying agent in an amount sufficient to give the formulation the desired level of pressure sensitivity.

5. An abrasive sheet according to claim 4 in which the pressure sensitive formulation additionally comprises from about 5 to about 10% by weight of a thermoplastic rubber comprising an ethylene/butylene copolymer with polystyrene end caps.

6. An abrasive sheet according to claim 4 in which the pressure sensitive formulation additionally comprises from about 5 to about 10% by weight of a polyethylene wax.

7. An abrasive sheet according to claim 4 in which the pressure sensitive formulation additionally comprises an antioxidant.

8. An abrasive sheet according to claim 4 in the form of a disc.

9. An abrasive sheet according to claim 4 in which the backing material is a paper.

10. An abrasive sheet in the form of a disc wherein the disc comprises a paper backing material with an abrasive layer adhered to one face and a pressure sensitive adhesive layer on the other surface in which the pressure sensitive adhesive comprises:

a. from about 15 to about 20% by weight of a propylene/1-butene/ethylene terpolymer;
b. from about 15 to about 20% by weight of a low molecular weight polybutene;
c. from about 10 to about 15% by weight of a polyisobutylene rubber;
d. from about 30 to about 45% by weight of a low molecular weight aliphatic hydrocarbon tackifying agent;
e. from about 5 to about 10% by weight of a polyethylene wax; and
f. from about 5 to about 10% by weight of a thermoplastic rubber comprising an ethylene/butylene coplymer with polystyrene end caps and wherein the end caps represent from about 5 to about 15% of the weight of the thermoplastic rubber.

11. An abrasive disc according to claim 10 in which the pressure sensitive adhesive further comprises up to 0.5% by weight of an antioxidant.

* * * * *